(12) United States Patent
Williams et al.

(10) Patent No.: US 11,915,075 B1
(45) Date of Patent: *Feb. 27, 2024

(54) CERAMIC TRANSACTION CARDS (71) Applicant: American Express Travel Related Services Company, Inc., New York, NY (US)

(72) Inventors: Troy Patrick Williams, New York, NY (US); Peter Bates, West Newton, MA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,512

(22) Filed: Dec. 14, 2021

Related U.S. Application Data (62) Division of application No. 16/810,112, filed on Mar. 5, 2020, now Pat. No. 11,227,201.

(51) Int. Cl.
*G06K 19/02* (2006.01)
*G06K 19/077* (2006.01)
*C04B 35/64* (2006.01)
*C04B 35/80* (2006.01)
*B32B 9/00* (2006.01)

(52) U.S. Cl.
CPC ............ *G06K 19/02* (2013.01); *B32B 9/005* (2013.01); *C04B 35/64* (2013.01); *C04B 35/80* (2013.01); *G06K 19/07722* (2013.01); *B32B 2425/00* (2013.01)

(58) Field of Classification Search
CPC .................... G06K 19/02; G06K 19/07722
USPC ......................... 235/487, 488, 492
See application file for complete search history.

(56) References Cited

U.S. PATENT DOCUMENTS

| | | |
|---|---|---|
| 3,468,046 A | 9/1969 | Makishima |
| 3,537,195 A | 11/1970 | Gerds |
| 3,583,317 A | 6/1971 | Gibson |

(Continued)

FOREIGN PATENT DOCUMENTS

| | | |
|---|---|---|
| CN | 1064471 | 9/1992 |
| EP | 0745955 | 12/1996 |

(Continued)

OTHER PUBLICATIONS

Examination Report dated Apr. 2, 2012 for Israel Patent Application No. 209457.

(Continued)

*Primary Examiner* — Suezu Ellis
(74) *Attorney, Agent, or Firm* — Thomas | Horstemeyer, LLP

(57) ABSTRACT

A transaction card that includes a card body that can include a ceramic material. The card body can include a primary surface and a secondary surface, a laser marked feature disposed on the card body and a laser etched feature disposed on the card body. A method of making a transaction card can include forming a ceramic material slurry comprising a ceramic material and a binder, forming a green body from the ceramic material slurry, firing the green body at a firing temperature to create a fired ceramic body, grinding the fired ceramic body into a card body, and polishing a primary surface of the card body.

20 Claims, 9 Drawing Sheets

(56) References Cited

U.S. PATENT DOCUMENTS

| | | | |
|---|---|---|---|
| 4,058,839 A | 11/1977 | Darjany | |
| 4,565,922 A | 1/1986 | Anderson | |
| 4,745,267 A | 5/1988 | Davis et al. | |
| 4,747,620 A | 5/1988 | Kay et al. | |
| 4,810,442 A | 3/1989 | Hillig et al. | |
| 4,849,618 A | 7/1989 | Namikawa et al. | |
| 4,876,441 A | 10/1989 | Hara et al. | |
| 4,889,366 A | 12/1989 | Fabbiani | |
| 4,923,471 A | 5/1990 | Morgan | |
| 4,996,411 A * | 2/1991 | Rebjock | G06K 19/07745 257/679 |
| 5,251,937 A | 10/1993 | Ojster | |
| 5,299,940 A | 4/1994 | Uenaka et al. | |
| 5,309,840 A | 5/1994 | Takamura et al. | |
| 5,330,794 A * | 7/1994 | Bosco | C04B 41/009 427/397.8 |
| 5,421,618 A | 6/1995 | Okazaki et al. | |
| 5,444,225 A | 8/1995 | Takahashi et al. | |
| 5,451,763 A | 9/1995 | Pickett et al. | |
| 5,488,017 A * | 1/1996 | Szweda | C04B 35/6264 428/688 |
| 5,492,370 A | 2/1996 | Chatwin et al. | |
| 5,514,240 A | 5/1996 | Hagiiiri-Teiirani et al. | |
| 5,569,898 A | 10/1996 | Fisher et al. | |
| 5,793,502 A | 8/1998 | Bianco et al. | |
| 5,804,342 A | 9/1998 | Paz-Pujalt et al. | |
| 5,844,230 A | 12/1998 | Lalonde | |
| 5,877,941 A | 3/1999 | Ryu | |
| 5,940,595 A | 8/1999 | Reber et al. | |
| RE36,356 E | 10/1999 | Gloton et al. | |
| 5,969,951 A | 10/1999 | Fischer et al. | |
| 5,988,503 A | 11/1999 | Kuo | |
| 6,025,283 A | 2/2000 | Roberts | |
| 6,121,069 A | 9/2000 | Boyko et al. | |
| 6,146,741 A | 11/2000 | Ogawa et al. | |
| 6,164,548 A | 12/2000 | Curiel | |
| 6,250,555 B1 | 6/2001 | Inamoto | |
| 6,294,241 B1 | 9/2001 | Kaule et al. | |
| 6,328,342 B1 | 12/2001 | Belousov et al. | |
| 6,337,752 B1 | 1/2002 | Heckenkamp et al. | |
| 6,382,506 B1 | 5/2002 | Van Der Valk | |
| 6,471,127 B2 | 10/2002 | Pentz et al. | |
| 6,471,128 B1 | 10/2002 | Corcoran et al. | |
| 6,482,330 B1 | 11/2002 | Bajorek | |
| 6,492,717 B1 | 12/2002 | Gore et al. | |
| 6,533,180 B1 | 3/2003 | Wood | |
| 6,644,551 B2 | 11/2003 | Clayman et al. | |
| 6,651,891 B1 | 11/2003 | Zakel et al. | |
| 6,715,797 B2 | 4/2004 | Curiel | |
| 6,734,887 B2 | 5/2004 | Field | |
| 6,886,246 B2 | 5/2005 | Chung | |
| 6,942,156 B2 | 9/2005 | Ohta et al. | |
| 7,036,739 B1 | 5/2006 | Mann et al. | |
| 7,375,975 B1 | 5/2008 | Jang et al. | |
| 7,461,791 B2 | 12/2008 | Keshura | |
| 7,494,057 B2 | 2/2009 | Lasch et al. | |
| 7,530,491 B2 | 5/2009 | Lasch et al. | |
| 7,588,184 B2 | 9/2009 | Gandel et al. | |
| 7,819,310 B2 | 10/2010 | Lasch et al. | |
| 7,823,777 B2 | 11/2010 | Varga et al. | |
| 7,971,786 B2 | 7/2011 | Lasch et al. | |
| 8,308,197 B2 | 11/2012 | Peters et al. | |
| 8,567,679 B1 | 10/2013 | Mullen et al. | |
| 8,725,589 B1 * | 5/2014 | Skelding | G07F 7/1008 156/60 |
| 9,836,684 B2 | 12/2017 | Finn et al. | |
| 9,836,687 B1 | 12/2017 | Williams et al. | |
| 10,607,125 B2 * | 3/2020 | Williams | G06K 19/07722 |
| 11,227,201 B1 * | 1/2022 | Williams | B32B 3/085 |
| 2001/0055702 A1 * | 12/2001 | Wang | G11B 11/10584 |
| 2002/0117846 A1 | 8/2002 | Kaule et al. | |
| 2002/0179463 A1 | 12/2002 | Newman | |
| 2003/0024995 A1 | 2/2003 | Conner et al. | |
| 2003/0047253 A1 | 3/2003 | Robinson et al. | |
| 2003/0102541 A1 | 6/2003 | Gore et al. | |
| 2003/0178495 A1 | 9/2003 | Jones et al. | |
| 2003/0202151 A1 | 10/2003 | Hinata | |
| 2004/0011874 A1 * | 1/2004 | Theodossiou | B41M 5/24 235/488 |
| 2004/0026518 A1 | 2/2004 | Kudo et al. | |
| 2004/0108504 A1 | 6/2004 | Forbes et al. | |
| 2004/0121257 A1 | 6/2004 | Kaminsky et al. | |
| 2004/0159709 A1 | 8/2004 | Ohta et al. | |
| 2004/0217178 A1 | 11/2004 | Lasch et al. | |
| 2005/0012326 A1 | 1/2005 | Keller et al. | |
| 2005/0156318 A1 | 7/2005 | Douglas | |
| 2005/0178827 A1 | 8/2005 | Shatford | |
| 2005/0194453 A1 | 9/2005 | Conner et al. | |
| 2005/0283839 A1 | 12/2005 | Cowburn | |
| 2006/0124753 A1 | 6/2006 | Scholz et al. | |
| 2006/0144952 A1 | 7/2006 | Kluge | |
| 2006/0146408 A1 | 7/2006 | Ushiro et al. | |
| 2006/0214008 A1 | 9/2006 | Asami et al. | |
| 2007/0285747 A1 | 12/2007 | Matsuura et al. | |
| 2008/0028841 A1 | 2/2008 | Ludwig et al. | |
| 2008/0191029 A1 | 8/2008 | Deloche | |
| 2008/0314995 A1 * | 12/2008 | Varga | G06K 19/02 235/487 |
| 2009/0019751 A1 | 1/2009 | Goetting | |
| 2009/0230195 A1 | 9/2009 | Lasch et al. | |
| 2009/0294543 A1 | 12/2009 | Varga et al. | |
| 2010/0038426 A1 | 2/2010 | Casden | |
| 2010/0147813 A1 * | 6/2010 | Lei | C03B 33/0222 219/121.72 |
| 2011/0193337 A1 | 8/2011 | Tziovaras et al. | |
| 2012/0018522 A1 * | 1/2012 | Le Garrec | G06K 19/07756 235/492 |
| 2012/0141814 A1 | 6/2012 | Petzoldt et al. | |
| 2013/0010578 A1 * | 1/2013 | Boucard | B28B 11/0845 368/280 |
| 2013/0182300 A1 * | 7/2013 | Muller | B42D 25/333 156/219 |
| 2013/0248607 A1 | 9/2013 | Zlotnik et al. | |
| 2013/0320095 A1 * | 12/2013 | Blum | G06K 19/02 235/488 |
| 2014/0070009 A1 | 3/2014 | Zambrano L. | |
| 2014/0307405 A1 | 10/2014 | Vogt | |
| 2014/0361086 A1 | 12/2014 | Finn et al. | |
| 2015/0004377 A1 | 1/2015 | Pudleiner et al. | |
| 2015/0021403 A1 | 1/2015 | Finn et al. | |
| 2015/0069131 A1 * | 3/2015 | Scanlon | G06K 19/02 235/487 |
| 2015/0339564 A1 * | 11/2015 | Herslow | B32B 13/06 156/60 |
| 2016/0042268 A1 | 2/2016 | Puttkammer | |
| 2016/0110639 A1 | 4/2016 | Finn et al. | |
| 2016/0232438 A1 | 8/2016 | Williams et al. | |
| 2016/0307088 A1 | 10/2016 | Wurmfeld et al. | |
| 2017/0106572 A1 | 4/2017 | Cepress et al. | |
| 2018/0068212 A1 | 3/2018 | Williams et al. | |

FOREIGN PATENT DOCUMENTS

| | | |
|---|---|---|
| WO | 2004063977 | 7/2004 |
| WO | 2006081385 | 8/2006 |

OTHER PUBLICATIONS

Examination Report dated May 21, 2019 in Bahrain Serial No. 19/2012.
Advisory Action dated Jun. 11, 2019 in U.S. Appl. No. 15/004,445.
Machine translation of EP 7 45955, European Patent Office, https://worldwide.espacenetcom/publicationdetails/biblio?CC=EP&N R=07 45955A2&KC =A2&FT=D&N D=3&date= 19961204&DB-EPODOC &locale=en_EP#, retrieved Apr. 5, 2019.
Non-Final Office Action dated Nov. 17, 2017 in U.S. Appl. No. 15/409,102.
Final Office Action dated Mar. 15, 2018 in U.S. Appl. No. 15/409,102.
Advisory Action dated May 1, 2018 in U.S. Appl. No. 15/409,102.
Final Office Action dated Sep. 14, 2018 in U.S. Appl. No. 15/409,102.
Examiner's Opinion dated Oct. 23, 2018 in BR Application No. PI0822723-3.

(56) References Cited

OTHER PUBLICATIONS

Notice of Allowance dated Dec. 19, 2018 in U.S. Appl. No. 15/409,102.
Non-Final Office Action dated Jul. 12, 2005 in U.S. Appl. No. 11/044,662.
Final Office Action dated Dec. 13, 2005 in U.S. Appl. No. 11/044,662.
Non-Final Office Action dated Jun. 5, 2006 in U.S. Appl. No. 11/044,662.
Final Office Action dated Dec. 15, 2006 in U.S. Appl. No. 11/044,662.
Non-Final Office Action dated Oct. 9, 2007 in U.S. Appl. No. 11/713,968.
Non-final Office Action dated Dec. 12, 2007 in U.S. Appl. No. 11/044,662.
Final Office Action dated May 15, 2008 in U.S. Appl. No. 11/713,968.
Non-final Office Action dated Jul. 1, 2008 in U.S. Appl. No. 11/044,662.
Advisory Action dated Jul. 29, 2008 in U.S. Appl. No. 11/713,968.
European Search Report dated Sep. 21, 2009 in EP Application No. 08165790.0.
International Search Report and Written Opinion dated Dec. 5, 2008, PCT/US2008/079016.
Non-final Office Action dated Jan. 2, 2009 in U.S. Appl. No. 11/044,662.
Non-final Office Action dated Apr. 20, 2009 in U.S. Appl. No. 11/044,662.
European Office Action dated Nov. 17, 2008 in EP Application No. 06719644.4.
Notice of Allowance dated Jul. 31, 2009 in U.S. Appl. No. 11/044,662.
European Office Action dated Jan. 13, 2010 in EP Application No. 06719644.4.
Notice of Allowance dated Sep. 10, 2010 in U.S. Appl. No. 12/125,750.
International Search Report and Written Opinion dated Oct. 20, 2010 in PCT Serial No. PCT/US2010/044848.
Non-Final Office action dated Aug. 3, 2010 in U.S. Appl. No. 12/125,750.
Non-Final Office Action dated Jan. 7, 2011 in U.S. Appl. No. 12/911,165.
European Examination Report dated Feb. 3, 2011 in EP Application No. 08165790.0.
Notice of Allowance dated Mar. 4, 2011 in U.S. Appl. No. 12/911,165.
Non-Final Office Action dated May 3, 2011 in U.S. Appl. No. 12/538,745.
Non-Final Office Action dated Sep. 16, 2011 in U.S. Appl. No. 13/116,922.
Non-Final Office Action dated Dec. 7, 2011 in U.S. Appl. No. 13/228,772.
Non-Final Office Action dated Jun. 29, 2012 in U.S. Appl. No. 13/462,465.
Examination Report dated Jul. 16, 2012 in CA Application No. 2725186.
International Report on Patentability dated Aug. 24, 2012 in PCT Serial No. PCT/US2010/044848.
Examination Report dated Sep. 18, 2012 in AU Application No. 2008356532.
Non-Final Office Action dated Feb. 26, 2013 in U.S. Appl. No. 13/732,802.
Examination Report dated May 10, 2013 in CA Application No. 2725186.
Office Action dated Jan. 27, 2016 in IN Application No. 4680/KOLNP/2010.
Non-Final Office Action dated Dec. 30, 2016 in U.S. Appl. No. 15/164,609.
Non-Final Office Action dated Jan. 10, 2017 in U.S. Appl. No. 15/164,627.
Final Office Action dated May 17, 2017 in U.S. Appl. No. 15/164,627.
Non-Final Office Action dated Sep. 6, 2018 filed in U.S. Appl. No. 15/004,445.
Final Office Action dated Apr. 17, 2018 in U.S. Appl. No. 15/004,445.
Advisory Action dated Jun. 6, 2018 in U.S. Appl. No. 15/004,445.
Office Action dated Feb. 3, 2017 in U.S. Appl. No. 15/004,445.
Restriction Requirement dated Mar. 18, 2016 un U.S. Appl. No. 15/004,445.
Office Action dated Apr. 22, 2016 in U.S. Appl. No. 15/004,445.
Final Office Action dated Oct. 20, 2016 in U.S. Appl. No. 15/004,445.
Advisory Action dated Dec. 29, 2016 in U.S. Appl. No. 15/004,445.
Final Office Action dated Jun. 2, 2017 in U.S. Appl. No. 15/004,445.
Advisory Action dated Aug. 16, 2017 in U.S. Appl. No. 15/004,445.
Office Action dated Oct. 4, 2017 in U.S. Appl. No. 15/004,445.
Machine translation of WO 2008/028841, European Patent Office, retrieved Sep. 28, 2020 (Year: 2020).
Final Office Action dated Apr. 11, 2019 in U.S. Appl. No. 15/004,445.

* cited by examiner

CERAMIC TRANSACTION CARDS

CROSS REFERENCE TO RELATED APPLICATIONS

This application is a divisional of copending U.S. patent application Ser. No. 16/810,112, entitled "CERAMIC TRANSACTION CARDS" and filed on Mar. 5, 2020, which is a continuation of U.S. patent application Ser. No. 15/070,414, entitled "METHOD OF MAKING CERAMIC-CONTAINING TRANSACTION CARDS" and filed on Mar. 15, 2016, which is a divisional of U.S. patent application Ser. No. 15/004,445 entitled "CERAMIC-CONTAINING TRANSACTION CARDS AND METHODS OF MAKING THE SAME" and filed Jan. 22, 2016. The '445 application claims priority to and the benefit of U.S. Provisional Patent Application No. 62/113,013 entitled "CERAMIC-CONTAINING TRANSACTION CARDS AND METHODS OF MAKING THE SAME" and filed Feb. 6, 2015. The contents of all are hereby incorporated by reference in their entireties.

FIELD

This disclosure generally includes ceramic-containing transaction cards useful for facilitating payments and methods of making the same. The transaction cards may include other features such as a microchip (e.g., smart card) and one or more antennae.

BACKGROUND

The proliferation of transaction cards (which allow the cardholder to, for example, pay with credit rather than cash) started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services, without the need to constantly possess cash. If a consumer needs cash, transaction cards allow access to funds through, for example, an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to help protect against forgery and tampering. Thus, the cards served as devices to provide data to merchants and the security associated with the card was the comparison of the cardholder's signature on the card to the cardholder's signature on a receipt along with the embossed cardholder's name on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards include not only demographic and account information, but the transaction cards also include graphic images, designs, photographs and security features.

Administrative and security issues (e.g., charges, credits, merchant settlement, fraud, reimbursements, etc.) have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, and calling cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to communicate purchase data received from a cash register device on-line to a host computer, along with the transmission of data stored in the magnetic stripe (e.g., account information and expiration date).

Due to the susceptibility of the magnetic stripe to tampering, the lack of confidentiality of the information within the magnetic stripe and the problems associated with the transmission of data to a host computer, integrated circuits were developed which may be incorporated into transaction cards. These integrated circuit (IC) cards, known as smart cards, proved to be very reliable in a variety of industries due to their advanced security and flexibility for future applications. However, even integrated circuit cards are susceptible to counterfeiting.

As magnetic stripe cards and smart cards developed, the market demanded international standards for the cards. The card's physical dimensions, features and embossing area were standardized under the International Standards Organization ("ISO"), ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch stripe located either in the front or rear surface of the card and which is divided into three longitudinally parallel tracks. The first and second tracks hold read-only information with room for 79 alphanumeric characters and 40 numeric characters, respectively. The third track is reserved for financial transactions and includes enciphered versions of the user's personal identification number, country code, currency units, amount authorized per cycle, subsidiary accounts, and restrictions.

More information regarding the features and specifications of transaction cards can be found in, for example, Smart Cards by Jose Luis Zoreda and Jose Manuel Oton, 1994; Smart Card Handbook by W. Rankl and W. Effing, 1997, and the various ISO standards for transaction cards available from ANSI (American National Standards Institute), 11 West 42nd Street, New York, N.Y. 10036.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices.

Typical transaction cards are made from thermoplastic materials, such as polyvinyl chloride (PVC) and polyethylene terephthalate (PET). However, these transaction cards are susceptible to being damaged or destroyed if exposed to damaging environments. For example, transaction cards may be damaged if left exposed to the elements for an extended period of time. Moisture and/or sunlight may break down the chemical bonds within the polymers of typical transaction cards, such that transaction cards left exposed to moisture and sunlight may become warped, cracked and/or unusable. In addition, thermoplastic transaction cards may be easily bent or may be broken or cut, thereby damaging the transaction card and rendering it unusable.

Therefore, a need exists for a transaction card that has both strength and durability. Moreover, a need exists for a transaction card that withstands exposure to the elements, such as moisture or sunlight.

SUMMARY

The disclosed transaction card may include a card body comprising a ceramic material, the card body including a primary surface and a secondary surface, a laser marked feature disposed on the card body and a laser etched feature disposed on the card body.

A method of making a transaction card may comprise forming a ceramic material slurry comprising a ceramic material and a binder, forming a green body from the ceramic material slurry, firing the green body at a firing temperature to create a fired ceramic body, grinding the fired ceramic body into a card body, and polishing a primary surface of the card body.

Additional features and advantages of the present invention are described in, and will be apparent from, the detailed description of the presently preferred embodiments and from the drawings.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

A transaction card may be a charge card, credit card, debit card, awards card, prepaid card, telephone card, smart card, magnetic stripe card, bar code card, transponder, radio frequency card and/or the like. The transaction card may have an associated account number (e.g., embossed, printed, and/or accessed), which cardholders typically present to merchants or use to interact with a machine, as part of a transaction, such as a purchase.

An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN). Internet code, other identification code, and/or the like which is optionally located on card. The account number may be distributed and stored in any form of plastic, ceramic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a geographic indicator and/or the like. The card may be associated with, have access to or include a rewards account, charge account, credit account, debit account, prepaid account, telephone card, embossed card, smart card, magnetic stripe card, bar code card, transponder, radio frequency card, key card, access card or an associated account.

Ceramic-containing transaction cards and methods of making the same are provided herein. The transaction cards may be standard-sized (i.e., about 3⅜ inches by about 2¼ inches by about 0.03 inches, and/or those dimensions specified in ISO 7810 and ISO 7811, for example, for an "ID-1" card) or any other size specified in ISO 7810 and ISO 7811 or any other size or configuration still usable as a transaction card (e.g., a larger transaction card, small transaction card, reduced size transaction card, foldable transaction card, the card being part of another device, the card being removed from another device). Moreover, the transaction card may have a magnetic stripe, an embedded microchip, a signature panel, a holographic image, and/or any feature typically contained on or within a transaction card. The transaction cards may have a card body comprised of a ceramic material. Various foldable cards and/or transaction cards of non-traditional size may be found in the below U.S. Patent documents, all of which are herein incorporated by reference in their entirety: U.S. patent application Ser. No. 10/906,731 filed on Mar. 3, 2005 and entitled System and Method for Non-Traditionally-Sized RF Transaction Card, U.S. patent application Ser. No. 10/906,732 filed on Mar. 3, 2005 and entitled Foldable Non-Traditionally-Sized RF Transaction Card System and Method, which issued as U.S. Pat. No. 7,156,301 on Jan. 2, 2007, U.S. patent application Ser. No. 10/436,343 filed on May 12, 2003 and entitled Compact or Convenient Transaction Cards, which issued as U.S. Pat. No. 7,124,955 on Oct. 24, 2006, and U.S. patent application Ser. No. 10/733,619 filed on Dec. 10, 2003 and entitled Foldable Transaction Card Systems, which issued as U.S. Pat. No. 7,147,151 on Dec. 12, 2006.

Figure 10:
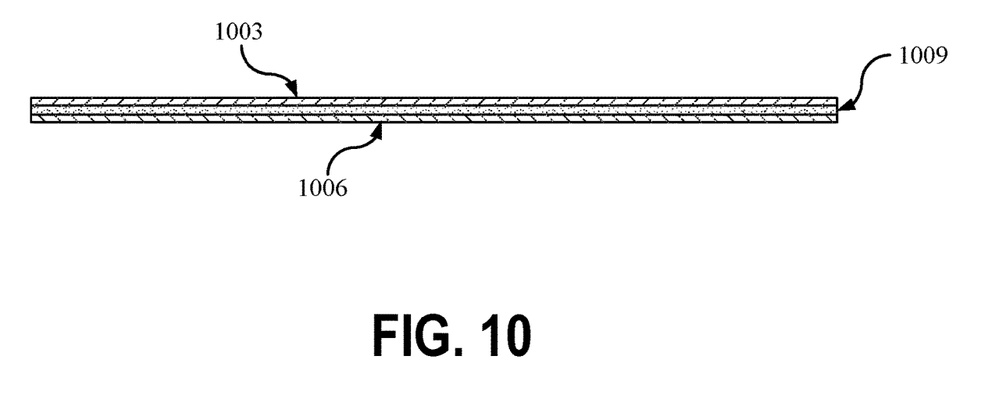
FIG. 10 illustrates one example of the ceramic transaction card with multiple layers.

A card body may refer to a material in any shape or thickness. The card body may be shaped substantially as a transaction card and/or a layer of a transaction card. In that regard, the material may be generally sized as a transaction card though it may not meet ISO 7810 and/or 7811 dimensions. A layer of a transaction card may refer to a material that has the length and width (as defined herein) substantially near the ISO 7810 and/or 7811 specified dimensions but has a thickness (as defined herein) less than the ISO 7810 and/or 7811 specified dimensions. In that regard, a ceramic-containing transaction card may comprise a layer of metal or plastic bonded, laminated and/or otherwise coupled to a layer of a ceramic material. With momentary reference to FIG. 10, one can see an example of a first layer 1003 and/or a second layer 1006 of metal or plastic bonded, laminated, and/or otherwise coupled to a third layer 1009 of a ceramic material. The ceramic material may be a fiber-reinforced ceramic material.

In various embodiments, a card body may comprise a ceramic material. A ceramic material may comprise any suitable ceramic as well as any suitable binder, dopant, or other adjunct (e.g. a dye) that may impart one or more physical characteristics to the ceramic. A ceramic material may comprise zirconium dioxide (zirconia), silicon carbide, boron carbide, or the like. Suitable dopants include yttria ($Y_2O_3$), calcium oxide, aluminum oxide, silicon dioxide, and other rare earth metals and their oxides. Suitable binders may include sodium silicate, magnesium aluminum silicates, polyvinyl alcohol, starches, carboxymethylcellulose, dextrin, and various the like. Various dyes may be used to alter the color of any portion or all of the card body.

In various embodiments, a card body may comprise a monolithic ceramic. A monolithic ceramic may be a ceramic material that is formed (e.g., fired or sintered) without the use of reinforcing fibers. In that regard, a monolithic ceramic is fired and/or sintered as one component. However, in various embodiments, a card body may comprise a fiber reinforced ceramic. As used herein, a "fiber reinforced ceramic" may comprise any fiber material that is reinforced with a ceramic material. For example, a carbon fiber-reinforced polymer may comprise carbon fiber reinforced with a ceramic material. In that regard, a fiber reinforced ceramic may include a fibrous material such as carbon fibers, aramid fibers, fiberglass fibers, or similar fibers reinforced with a ceramic material, such zirconia and/or silicon carbide. Fibrous reinforced polymers tend to have a high strength to weight ratio, typically allowing for a stiff component to be produced with relatively light weight.

Ceramic materials that have undergone firing and/or sintering (i.e., fired ceramic materials) may be subject to grinding. In that regard, any suitable abrasive may be used to grind a fired ceramic material. For example, a grinding wheel, grinding belt, or abrasive powder may be used to grind a fired ceramic material. Grinding may proceed under dry conditions or wet conditions.

Grinding may be used to create a chamfered edge on a card body. A chamfered edge is a beveled edge connecting two surfaces. A beveled edge is an edge of a structure that is not perpendicular to the faces of a card body. Grinding may be used to create a chamfered edge of a card body.

Grinding may be used to create a rounded edge on a card body. A rounded edge is a semi-cylindrical edge connecting two surfaces. Grinding may be used to create a rounded edge of a card body.

Grinding may also be used to create a bullnose edge on a card body. A bullnose edge may comprise two convex surfaces extending from each of a primary card surface and a secondary card surface to converge on a surface that is 90 degrees or about 90 degrees from the primary card surface and the secondary card surface, where the term about in this context only means+/−5 degrees. Grinding may be used to create a bullnose edge of a card body.

Fired ceramic materials may be subject to polishing, for example, after grinding. In that regard, any suitable polishing and/or buffing technique may be used to polish a fired ceramic material. For example, a polishing cloth or other textile may be used, with or without polishing aids such as polishing wax or polishing paste, may be applied to a fired ceramic materials. Buffing may be performed with commercially available buffing equipment. Polishing and/or buffing may cause a fired ceramic material to have a glossy and/or highly reflective finish.

In various embodiments, as described herein, a card body may comprise a fired ceramic material. The card body may be polished and/or buffed to a glossy, highly reflective finish. In various embodiments, one or more lasers may be used to alter the card body. A laser may emit a focused beam of light having a given power output. Thus, a laser directed at a surface may have varying effects on the surface based upon the power output of the laser and the duration of exposure. Lasers may emit a light over a small area, providing the ability for precision works. Moreover, lasers may be accurately and precisely controlled via electronic control systems for manufacturing ease. A typical laser may be obtained from Virtek Laser Solutions, Inc. In various embodiments, a 1064 nm, 25 W diode pumped $YVO_4$ laser may be used.

The effect a laser may have on a ceramic material depends in part on the power output of the laser and the duration of exposure. For example, exposure for a short time to a low power laser may alter the surface characteristics of a ceramic material, for example, changing a glossy finished surface to a matte finish (i.e., one that is not as reflective to visible light). In contrast, exposure to a high power output laser for a first duration, or a lower power output laser for a second duration that is longer than the first duration, may cause a perforation of the ceramic material. In that regard, various laser processes may be characterized by their effect on a ceramic material. These various techniques may be applied, in various embodiments, in the manufacture of a transaction card. Lasers can provide marking of ceramic materials at depths of as low as about 0.0003 inches. Though lasers may have various power outputs, for purposes of explanation, various laser processes may be characterized by the total power during the exposure to a ceramic material. Stated another way, the total power of laser exposure to a surface may be thought of as the amount of laser energy applied per unit time of exposure.

As used herein, "laser finishing" may refer to application of a laser to a ceramic material (e.g., a card body comprising a ceramic material) to remove and/or disrupt a glossy and/or highly reflective finish. In that regard, laser finishing may impart a matte finish on a ceramic material surface.

As used herein, "laser marking" may refer to application of a laser to a ceramic material (e.g., a card body comprising a ceramic material) to impart a visible disruption to the ceramic material surface. For example, laser marking may remove a portion of ceramic material from a ceramic material surface. In that regard, laser marking may impart visible features to a ceramic material surface. For example, laser marking may be used to impart readable text onto a ceramic material surface. In various embodiments, account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters may be laser marked onto a ceramic material surface. Laser marking involves the application of more total power from a laser than laser finishing.

As used herein, "laser etch" may refer to application of a laser to a ceramic material (e.g., a card body comprising a ceramic material) to impart an indentation to the ceramic material surface. For example, laser etching may remove a portion of ceramic material from a ceramic material surface. In that regard, laser marking may impart visible features to a ceramic material surface that have a palpable depth. For example, laser etching may be used to impart various graphic features onto a ceramic material surface. In various embodiments, a logo, a decorative border, a brand name, and/or other features may be laser etched onto a ceramic material surface. Laser etching involves the application of more total power from a laser than laser marking.

As used herein, "laser perforation" may refer to application of a laser to a ceramic material (e.g., a card body comprising a ceramic material) to bore a hole completely through the card body. In that regard, laser perforation may remove all ceramic material in its path. For example, laser etching may completely remove ceramic material from a ceramic material surface, leaving a through hole. In that regard, laser perforation may impart visible features to a ceramic material surface that traverse a thickness (as defined herein) of a card body. For example, laser perforation may be used to impart various graphic features onto a ceramic material surface. In various embodiments, a logo and/or other features may be laser etched onto a ceramic material surface. Laser perforation involves the application of more total power from a laser than laser etching. Laser cutting may be performed with similar laser parameters as laser perforation, but laser cutting may be used to remove ceramic material in any suitable manner.

Referring now to the drawings, FIGS. 1, 2, 3A, 3B and 3C illustrate a ceramic transaction card 100 showing primary surface 122. The ceramic transaction card 100 may be composed of at least one layer of ceramic material. Width 102 is shown relative to height 104 and thickness 106. Primary surface 122 contains various features that are produced through laser marking, laser finishing, laser etching, and laser perforation, as described herein.

Figure 3A:
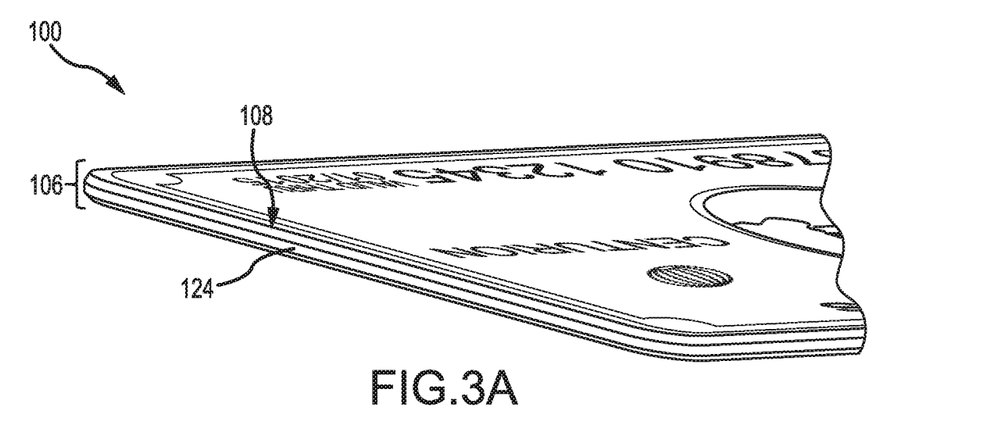
FIG. 3A illustrates an isometric view of a primary surface of a ceramic transaction card and a chamfered edge, in accordance with various embodiments.
Figure 3B:
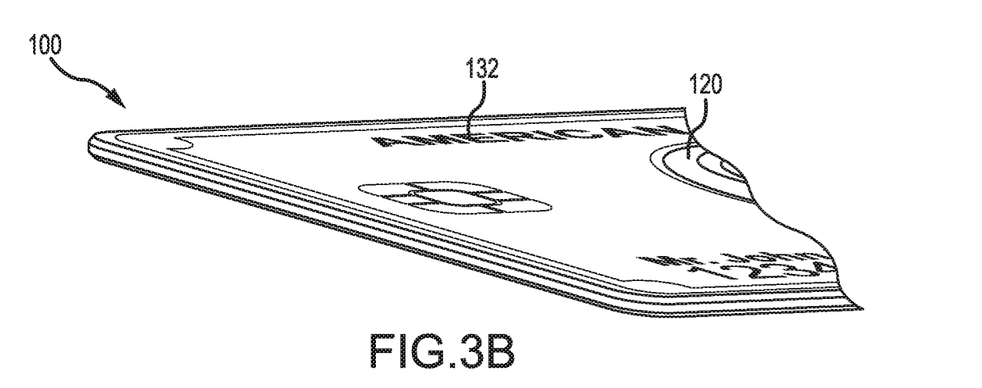
FIG. 3B illustrates a further isometric view of a primary surface of a ceramic transaction card, in accordance with various embodiments.
Figure 3C:
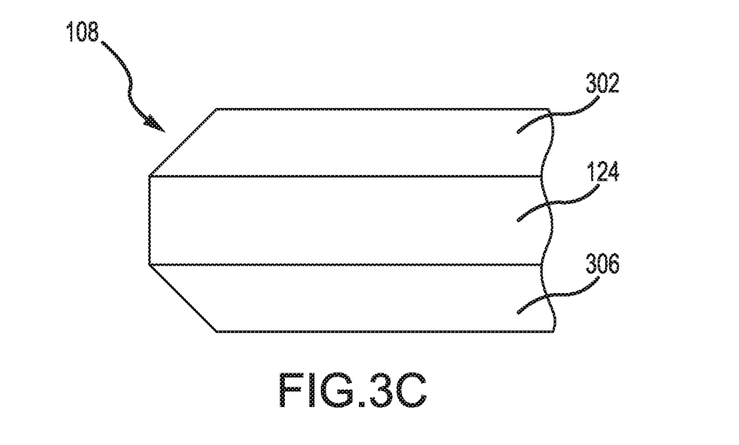
FIG. 3C illustrates a close up view of a chamfered edge in accordance with various embodiments.

Chamfered edge 108 is shown connecting primary surface 122 to side surface 124. With reference to FIG. 3C, a close up of chamfered edge 108 is illustrated. Primary surface 122 is shown connected to side surface 124 by chamfered surface 302. Secondary surface 210 is shown connected to side surface 124 by chamfered surface 306. Chamfered surface 302 may be disposed between 30 degrees and 60 degrees from primary surface 122 and from 30 degrees and 60 degrees from side surface 124. Chamfered surface 306 may be disposed between 30 degrees and 60 degrees from secondary surface 210 and from 30 degrees and 60 degrees from side surface 124. Chamfered edge 108 may be produced by grinding and may be polished. In various embodiments, chamfered edge 108 may formed in a green body prior to firing the green body. In various embodiments, chamfered edge 108 is laser finished to create a matte finish. In various embodiments, however, an edge of ceramic transaction card 100 may take any suitable profile, for example rounded or squared.

Figure 4A:
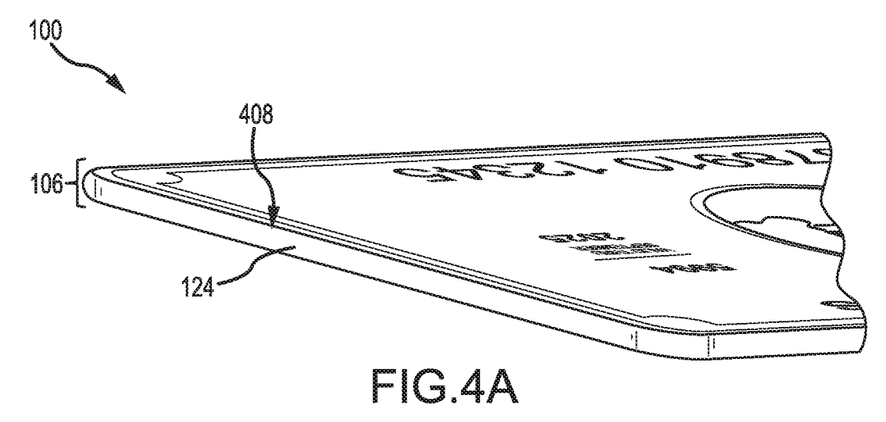
FIG. 4A illustrates an isometric view of a primary surface of a ceramic transaction card and a rounded edge, in accordance with various embodiments.
Figure 4B:
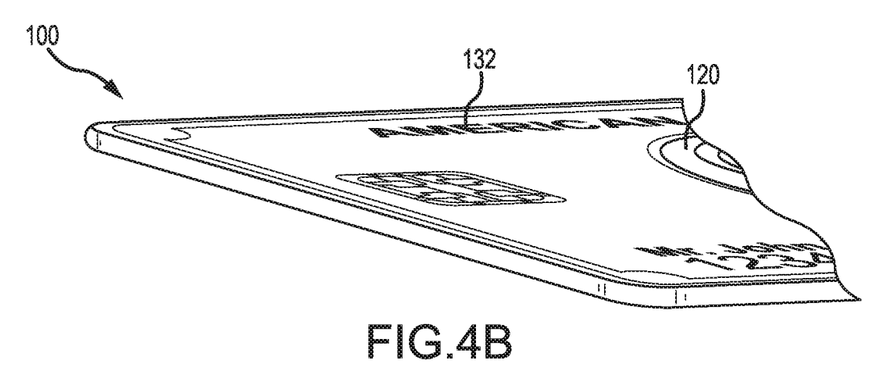
FIG. 4B illustrates a further isometric view of a primary surface of a ceramic transaction card having a rounded edge, in accordance with various embodiments.
Figure 4C:
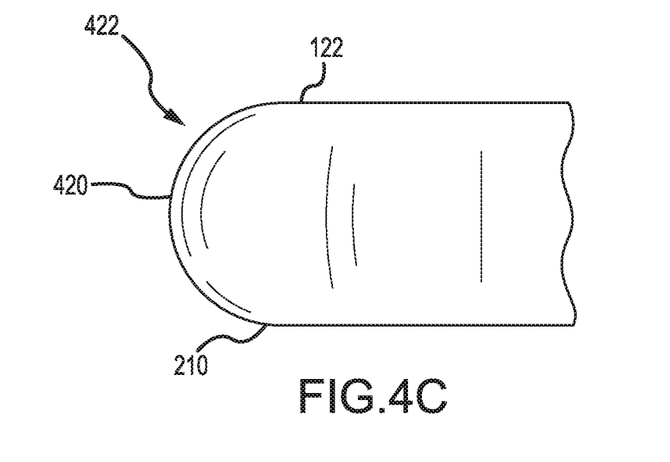
FIG. 4C illustrates a close up view of a rounded edge, in accordance with various embodiments.

With momentary reference to FIGS. 4A-4C, rounded edge 422 is shown connecting primary surface 122 to side surface 124. With particular reference to FIG. 4C, a close up of rounded edge 422 is illustrated. Primary surface 122 is shown connected to secondary surface 210 by semi-cylindrical surface 420 of rounded edge 422. Semi-cylindrical surface 420 may comprise a convex surface connecting primary surface 122 to secondary surface 210. Rounded edge 422 may be produced by grinding and may be polished. In various embodiments, rounded edge 422 may formed in a green body prior to firing the green body. In various embodiments, rounded edge 422 is laser finished to create a matte finish.

Figure 5A:
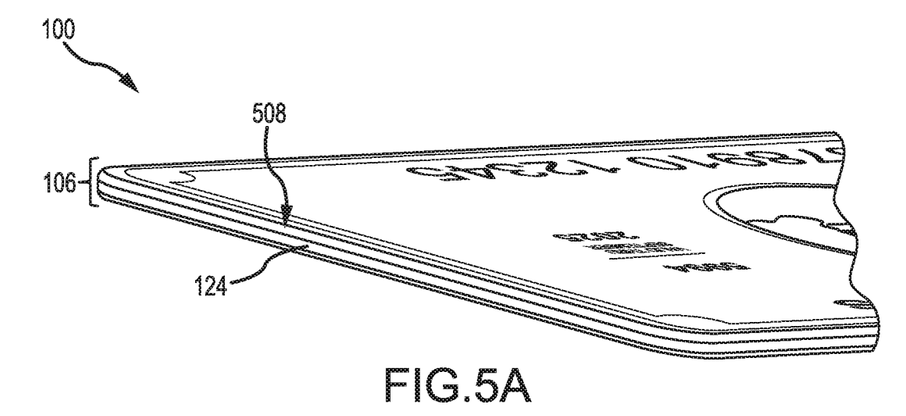
FIG. 5A illustrates an isometric view of a primary surface of a ceramic transaction card and a bullnose edge, in accordance with various embodiments.
Figure 5B:
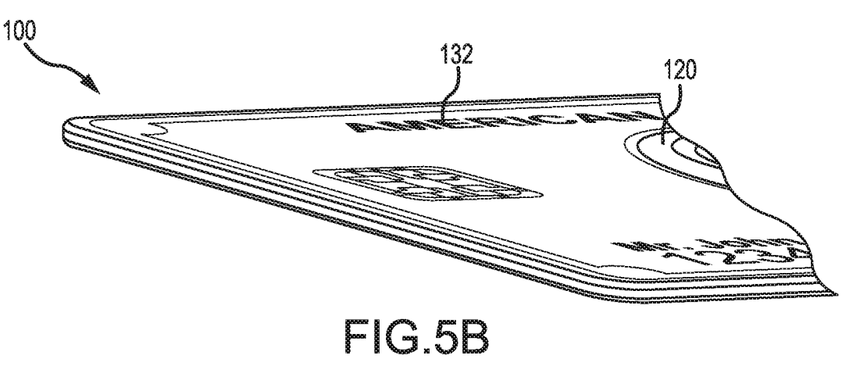
FIG. 5B illustrates a further isometric view of a primary surface of a ceramic transaction card having a bullnose edge, in accordance with various embodiments.
Figure 5C:
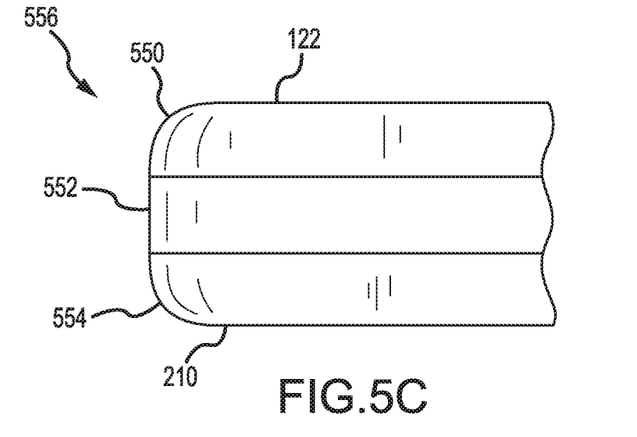
FIG. 5C illustrates a close up view of a bullnose edge, in accordance with various embodiments.

With momentary reference to FIGS. 5A-5C, bullnose edge 556 is shown connecting primary surface 122 to side surface 124. With particular reference to FIG. 5C, a close up of bullnose edge 556 is illustrated. Primary surface 122 is shown connected to secondary surface 210 by rounded surface 550, straight edge 552, and rounded edge 554. In that regard, rounded surface 550 transitions primary surface 122 to straight edge 552. Straight edge 552 is about 90 degrees to primary surface 122, where the term "about" in this context only means+/−5 degrees. Rounded surface 550 transitions secondary surface 210 to straight edge 552. Straight edge 552 is about 90 degrees to secondary surface 210, where the term "about" in this context only means+/−5 degrees. Bullnose edge 556 may be produced by grinding and may be polished. In various embodiments, bullnose edge 556 may formed in a green body prior to firing the green body. In various embodiments, bullnose edge 556 is laser finished to create a matte finish.

Figure 1:
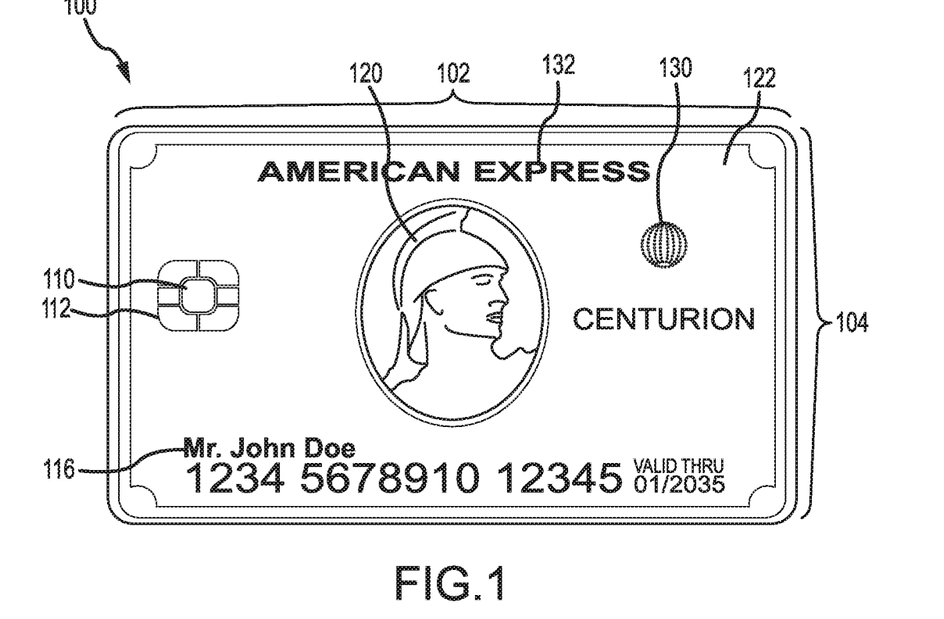
FIG. 1 illustrates a view of a primary surface of a ceramic transaction card, in accordance with various embodiments.

Primary surface 122 may comprise one or more of a matte surface and a glossy surface. In various embodiments, primary surface 122 may be polished to a glossy, highly reflective surface. Laser finishing may be used to transform a portion of the glossy surface to a matte finish.

Ceramic transaction card 100 may comprise pocket 112. Pocket 112 may comprise an indentation or other depression that is offset from primary surface 122. Microchip 110 is disposed in pocket 112. The position of microchip 110 on the ceramic transaction card 100 may be standardized by industry practice (for example, ISO 7816). Microchip 110 may include an integrated antenna so that microchip 110 may facilitate wireless transactions. Microchip 110 may comprise any suitable recordable media, for example, an integrated circuit. Microchip 110 may comply with one or more industry standards such as ISO 7819 and ISO 7816 to provide "smartcard" functionality to ceramic transaction card 100. In that regard, microchip 110 may aid in the facilitation of financial transactions. Many jurisdictions may now prefer a microchip in transaction cards. Microchip 110 may be disposed onto a card body in a variety of ways. Pocket 112 may be formed so that when microchip 110 is disposed therein, a surface of microchip 110 will be flush or substantially flush with primary surface 122. An adhesive may be disposed in the pocket 112 or on the microchip 110 prior to positioning a microchip 110 into a pocket 112 in ceramic transaction card 100. Any suitable adhesive may be used. For example, ABLEBOND 931-1T1N1 may be used for this purpose. Further, in various embodiments, an insulating material may be disposed in the card body pocket to be positioned between the microchip and the card body so as to electrically insulate the microchip and the card body. An adhesive may act as an insulating material. Any insulator may be used for this purpose.

Laser marked feature 116 is disposed on primary surface 122. Laser marked feature may be produced by laser marking, as discussed above. In various embodiments, laser marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Laser etched feature 120 is disposed on primary surface 122. Laser etched feature may be produced by laser etching, as discussed above. In various embodiments, laser etched feature may include a logo, and/or a decorative feature such as a border, though other patterns are contemplated herein.

Figure 2:
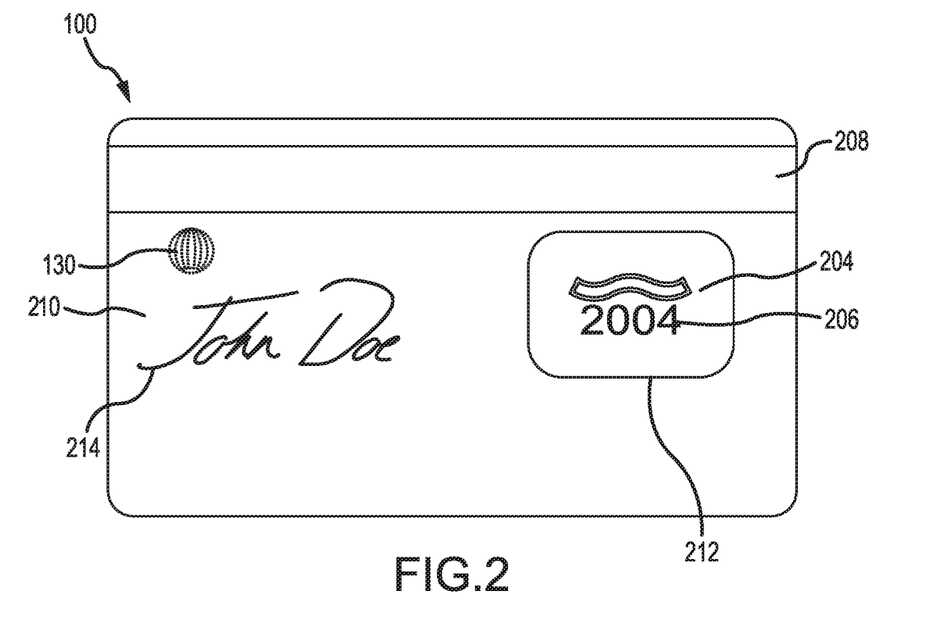
FIG. 2 illustrates a view of a secondary surface of a ceramic transaction card, in accordance with various embodiments.

Secondary surface 210 may comprise gloss/matte feature 212. Gloss/matte feature 212 may comprise a feature that comprises a gloss portion 206 and matte portion 204. Together, gloss portion 206 and matte portion 204 may be configured to display account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters. In that regard, alphanumeric characters may be formed as gloss portion 206 against background of matte portion 204.

Magnetic stripe 208 may be disposed on secondary surface 210. Magnetic stripe 208 may comprise any suitable recordable media. Magnetic stripe 208 may be encoded via any encoding processes commonly used to encode the transaction cards. Specifically, either or both of the recordable media, such as the magnetic stripe and/or the microchip, may be encoded to provide ceramic transaction card 100 with information beneficial to facilitate a financial transaction. The recordable media may be read via a magnetic stripe reader or a microchip reader.

Secondary surface 210 may comprise laser marked feature 214. Laser marked feature 214 may comprise marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Primary surface 122 and secondary surface 210 may comprise laser perforation 130. Laser perforation 130 may be a perforation in primary surface 122 that forms a channel to secondary surface 210. In that regard, laser perforation 130 comprises a hole through both primary surface 122 and secondary surface 210. Laser perforation 130 may comprise any suitable configuration and may comprise marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Figure 9:
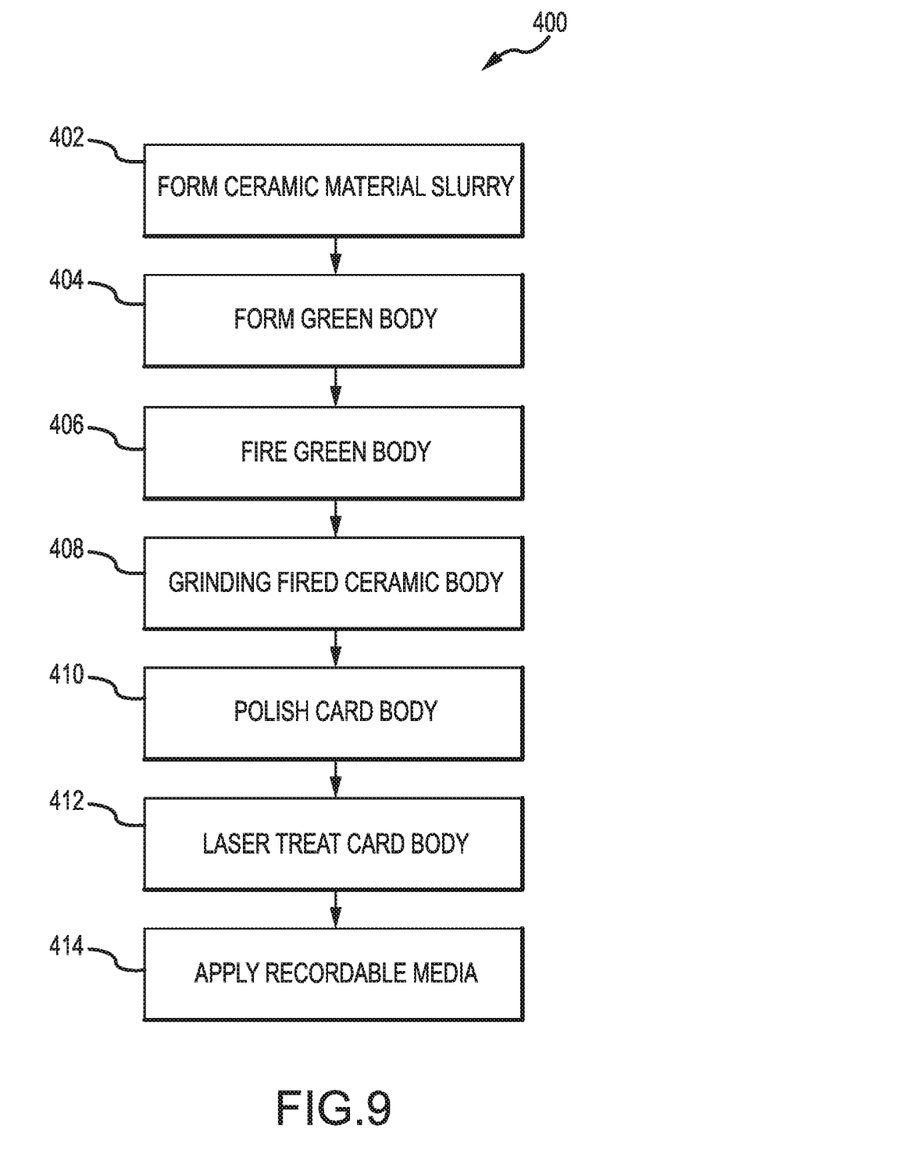
FIG. 9 illustrates a method of making a ceramic transaction card, in accordance with various embodiments.

With reference to FIG. 9, method 400 is shown of manufacturing a ceramic transaction card, such as ceramic transaction card 100. A ceramic material slurry may be formed in step 402. A ceramic material slurry may comprise a solid phase and a liquid phase. The liquid phase may comprise water, an alcohol, or any other suitable liquid for use in ceramic material slurries. The solid phase may comprise any suitable ceramic material as well as any suitable binder, dopant, or other adjunct (e.g. a dye) that may impart one or more physical characteristics to the ceramic. A ceramic material may comprise zirconium dioxide (zirconia), silicon carbide, boron carbide, or the like. Suitable dopants include yttria ($Y_2O_3$), calcium oxide, aluminum oxide, silicon dioxide, and other rare earth metals and their oxides. Suitable binders may include sodium silicate, magnesium aluminum silicates, polyvinyl alcohol, starches, carboxymethylcellulose, dextrin, and various the like. Various dyes may be used to alter the color of a card body. Dopants, dyes, adjuncts, and ceramic materials may take the form of a powder. In various embodiments, zirconia and yttria comprise a solid phase of a ceramic material slurry. In various embodiments, zirconia comprises a solid phase of a ceramic material slurry. The proportion of liquid phase to solid phase in the ceramic material slurry may be adjusted according to various manufacturing parameters.

A ceramic material slurry may be formed into a green body in step 404. A green body may take the shape of a card body. In that regard, a green body generally having the shape of a transaction card in accordance with an ID-1 transaction card as defined by ISO 7810 and/or ISO 7811 is formed. In various embodiments, the green body may comprise a card body having dimensions of about 5% to 20% greater than the dimensions of a transaction card in accordance with an ID-1 transaction card as defined by ISO 7810 and/or ISO 7811. In various embodiments, the green body may comprise a card body having dimensions of about 10% to 15% greater than the dimensions of a transaction card in accordance with an ID-1 transaction card as defined by ISO 7810 and/or ISO 7811. It should be noted that a pocket such as pocket 112 may be formed into the green body prior to firing. However, in various embodiments, pocket 112 may be laser cut into a card body. In further embodiments, a green body may not have a pocket 112 and, after firing, pocket 112 may be formed by machining and/or grinding.

A green body may be fired in step 406. A green body may be fired in any suitable manner. For example, a green body may be placed in a furnace and exposed to elevated temperatures for a given period of time to form a fired green body. In various embodiments, the green body comprises zirconia. Firing may cause the green body to contract, thus decreasing its volume. In various embodiments, a green body may lose 10% of its volume during firing. In that regard, it is beneficial to size the green body so that the fired green body has dimensions larger than a transaction card in accordance with an ID-1 transaction card as defined by ISO 7810 and/or ISO 7811.

The fired green body may be subject to grinding in step 408 to form a ground card body. Grinding may proceed according to any suitable technique, for example, use of a grinding wheel or belt. Grinding may be dry or may occur under liquid media. Grinding may be used to reduce the size of the fired green body to dimensions that are within the specification for a transaction card in accordance with an ID-1 transaction card as defined by ISO 7810 and/or ISO 7811. Grinding may also impart a chamfered edge to the fired green body. A chamfered edge may provide a pleasing tactile profile, as well as prevent a sharp edge from developing.

The ground card body may be subject to polishing in step 410 to form a polished card body. Polishing may proceed according to any suitable technique, for example, use of a polishing cloth with or without a polishing media such as polishing paste. Step 410 may comprise buffing according to any suitable buffing technique. Step 410 may result in imparting a glossy, highly reflective surface to the ground card body.

The polished card body may be subject to laser treatment in step 412. As discussed above, laser treatment may comprise laser finishing, laser marking, laser etching, and laser perforation. In that regard, laser finishing, laser marking, laser etching, and laser perforation may be performed on the polished card body to create the various features described in connection with those techniques. In various embodiments, a single laser is used for laser treating and set to different total power outputs to accomplish each task. Certain indicia, such as a cardholder's signature, may be captured digitally and used as a digital template to guide the laser in laser marking the cardholder's signature.

The polished card body may have recordable media applied in step 414. A magnetic stripe may be disposed on the card body using an adhesive or other suitable coupling media. A microchip may be installed in the pocket as described herein.

Figure 6A:
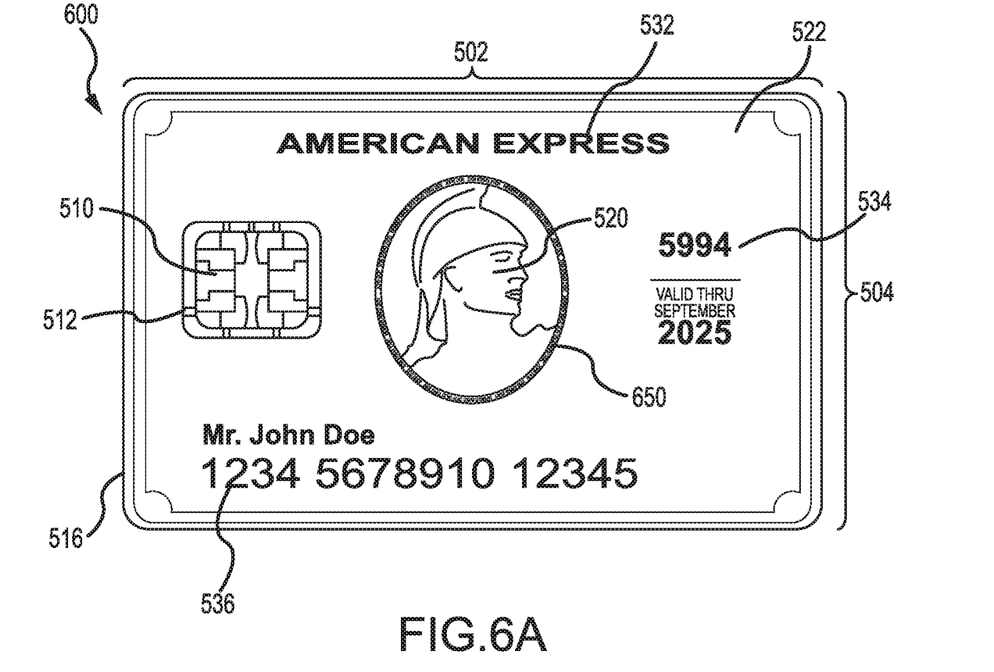
FIGS. 6A and 6B illustrate a primary surface of a ceramic transaction card, in accordance with various embodiments.
Figure 8:
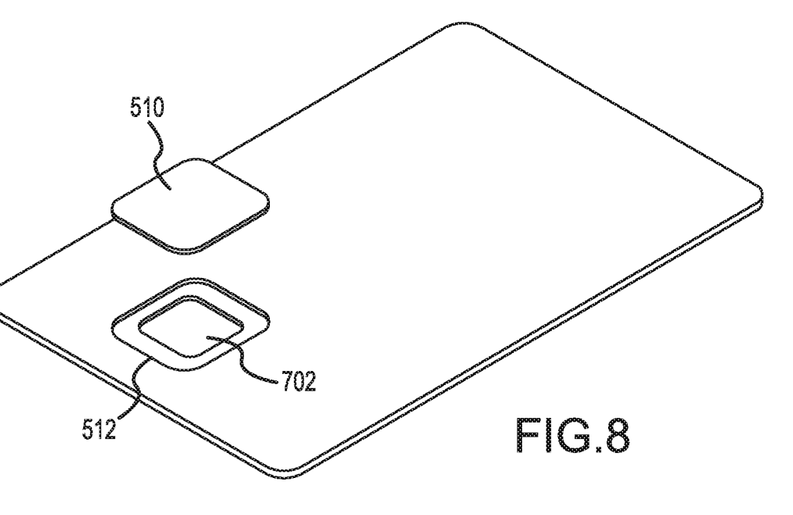
FIG. 8 illustrates an exploded view of a ceramic transaction card, in accordance with various embodiments.

With reference to FIG. 6A, ceramic transaction card 600 is shown. Width 502 is shown relative to height 504. Ceramic transaction card 600 may comprise pocket 512. Pocket 512 may comprise an indentation or other depression that is offset from primary surface 522. Integrated RF module 510 is disposed in pocket 512. With momentary reference to FIG. 8, pocket 512 may include recess 702. Thus, integrated RF module 510 may be of non-uniform thickness. Thus, a portion of Integrated RF module 510 may rest in pocket 512 but a portion of integrated RF module 510 may rest in recess 702. The position of integrated RF module 510 on the ceramic transaction card 600 may be standardized by industry practice (for example, ISO 7816). Integrated RF module 510 may include an integrated antenna so that a microchip within integrated RF module 510 may facilitate contact based "smartcard" transactions as well as wireless transactions via a wireless interface and an antenna of integrated RF module 510.

Integrated RF module 510 may thus comprise any suitable recordable media, for example, an integrated circuit. Integrated RF module 510 may also comprise a wireless interface configured to transmit wireless information via an antenna integrated into integrated RF module 510. Integrated RF module 510 may comply with one or more industry standards such as ISO 7819 and ISO 7816 to provide "smartcard" functionality to ceramic transaction card 600. Many jurisdictions may now prefer a microchip in transaction cards. Integrated RF module 510 may be disposed onto a card body in a variety of ways. Pocket 512 may be formed so that when integrated RF module 510 is disposed therein, a surface of integrated RF module 510 will be flush or substantially flush with primary surface 522. An adhesive may be disposed in the pocket 512 or on the integrated RF module 510 prior to positioning a integrated RF module 510 into a pocket 512 in ceramic transaction card 600. Any suitable adhesive may be used. For example, ABLEBOND 931-1T1N1 may be used for this purpose. Further, in various embodiments, an insulating material may be disposed in the pocket 512 to be positioned between the integrated RF module 510 and the card body so as to electrically insulate the integrated RF module 510 and the card body. An adhesive may act as an insulating material. Any insulator may be used for this purpose.

Laser marked feature 536 is disposed on primary surface 522. Laser marked feature may be produced by laser marking, as discussed above. In various embodiments, laser marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Laser etched features 516 and 520 is disposed on primary surface 522. Laser etched feature may be produced by laser etching, as discussed above. In various embodiments, laser etched feature may include a logo, and/or a decorative feature such as a border, though other patterns are contemplated herein.

Figure 6B:
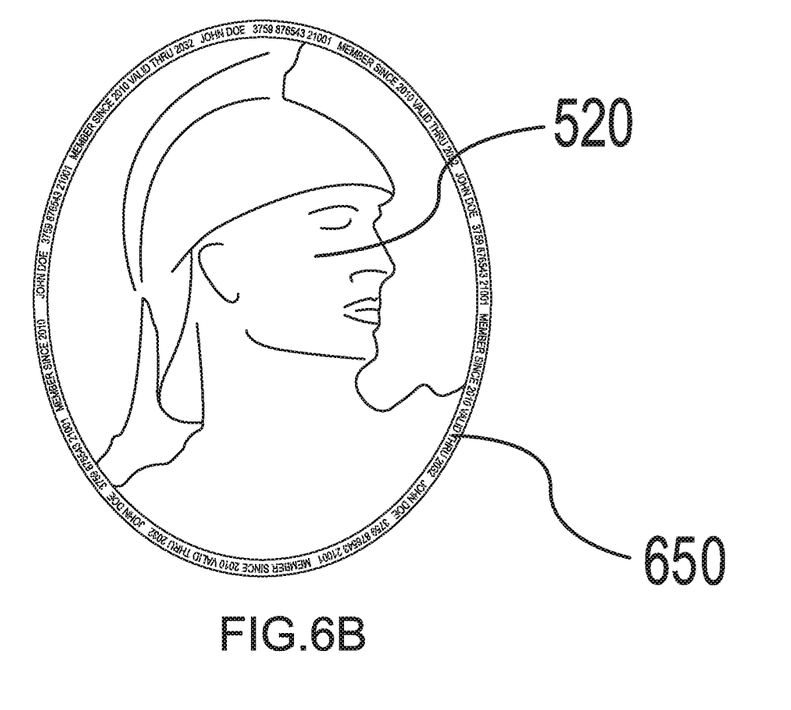

With reference to FIG. 6B, in various embodiments, microtype 650 may be disposed adjacent to, or around, laser etched feature 520. Microtype 650 may comprise laser etched or laser marked features, such as text, in small type, for example, using font size 9 (~0.125 inches) and below. Microtype 650 may comprise account indicia such as an account number, an accountholder's name, a loyalty notation (e.g., "Member Since 2001"), an expiration date, a signature, a brand name, and the like. In this regard, microtype 650 serves as a security and personalization feature, making ceramic transaction card 600 more resistant to compromise.

Figure 7:
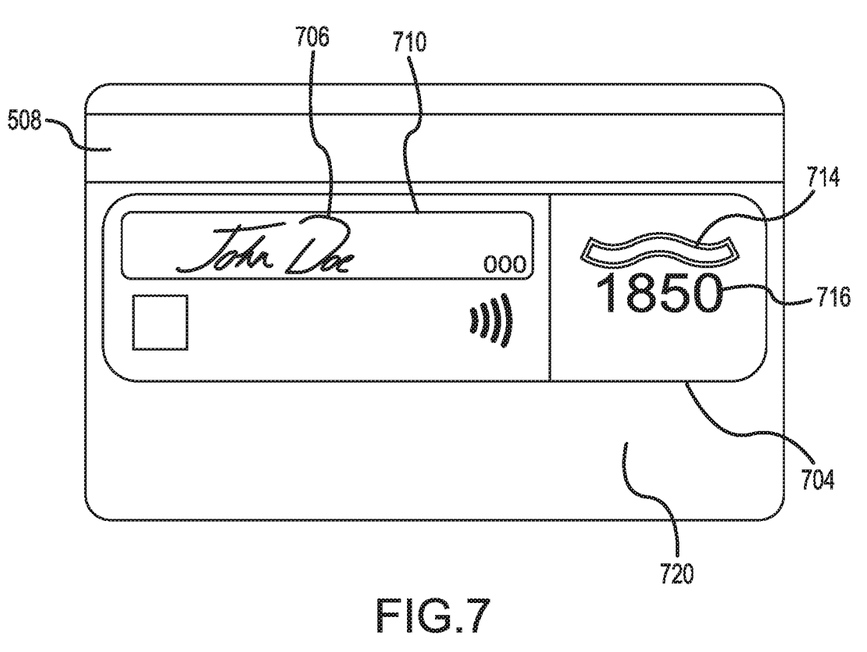
FIG. 7 illustrates a secondary surface of a ceramic transaction card, in accordance with various embodiments.

With reference to FIG. 7, secondary surface 720 may comprise gloss/matte feature 704. Gloss/matte feature 704 may comprise a feature that comprises a gloss portion 716 and matte portion 714. Together, gloss portion 716 and matte portion 714 may be configured to display account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters. In that regard, alphanumeric characters may be formed as gloss portion 716 against background of matte portion 714.

Magnetic stripe 508 may be disposed on secondary surface 720. Magnetic stripe 508 may comprise any suitable recordable media. Magnetic stripe 508 may be encoded via any encoding processes commonly used to encode the transaction cards. Specifically, either or both of the recordable media, such as the magnetic stripe and/or the microchip, may be encoded to provide ceramic transaction card 600 with information beneficial to facilitate a financial transaction. The recordable media may be read via a magnetic stripe reader or a microchip reader.

Secondary surface 720 may comprise signature feature 706. Signature feature 706 may include a signature. The signature may be laser marked or laser etched. However, in various embodiments, signature panel 710 may be disposed on secondary surface 720 and signature feature 706 may comprise a handwritten signature.

Ceramic transaction cards have a number of advantages over conventional transaction cards comprised of plastic or metal. Ceramic materials may be very hard and thus ceramic transaction cards may resist scratching. Ceramic transaction cards may be more resistant to deformation that plastic or metal. Combinations of various features found in ceramic transaction cards described herein may be very difficult to reproduce without costly equipment and know-how. Thus, the risk of fraudulent reproduction of ceramic transaction cards is reduced, thus leading to more security. Ceramic transaction cards may further provide a luxurious look and feel, which may be beneficial in the marketplace.

In various embodiments, cards, components, modules, and/or engines of the system may be implemented in association with micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, any terms similar to "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The card or associated systems may include or interface with any accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the card, system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled. For example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, we claim:

1. A transaction card, comprising:
a card body comprising a fiber-reinforced ceramic material, the card body including a primary surface and a secondary surface;
a metal or plastic layer laminated to the primary surface of the card body;
a pocket disposed in the primary surface, the pocket extending through the metal or plastic layer;
a recess within the pocket; and
a module disposed in the pocket, wherein:
a first surface of the module is flush with the primary surface;
an insulating material is disposed in the recess of the pocket, the insulating material acting as an adhesive and to electrically insulate the module;
the module has a non-uniform thickness; and
at least a portion of a second surface of the module is over the recess.

2. The transaction card of 1, further comprising a laser matte feature disposed directly in the fiber-reinforced ceramic material on the primary surface, the laser matte feature comprising at least a portion of the primary surface of the fiber-reinforced ceramic material.

3. The transaction card of 1, further comprising a chamfered edge between the primary surface and a side surface.

4. The transaction card of 1, further comprising a laser marked feature disposed on the primary surface of the card body.

5. The transaction card of 1, further comprising a laser etched feature disposed on the card body, the laser etched feature comprising an indentation on at least one of the primary surface or the secondary surface.

6. The transaction card of claim 1, further comprising a plastic or metal layer laminated to the secondary surface of the card body.

7. The transaction card of 1, wherein the module is an integrated radio frequency (RF) module.

8. A transaction card manufactured by the process of:
creating a card body comprising a fiber-reinforced ceramic material, the card body including a primary surface and a secondary surface;
laminating a plastic or metal layer to the primary surface of the card body;
creating a pocket in the primary surface, the pocket extending through the plastic or metal layer;
creating a recess within the pocket; and
placing a module within the pocket, wherein:
a first surface of the module is flush with the primary surface;
an insulating material is disposed in the recess of the pocket, the insulating material acting as an adhesive and to electrically insulate the module;
the module has a non-uniform thickness; and
at least a portion of the second surface of the module is over the recess.

9. The transaction card of claim 8 manufactured by the process further comprising laser finishing the primary surface to add a laser matte feature disposed directly in the fiber-reinforced ceramic material, wherein the laser matte feature comprises at least a portion of the primary surface.

10. The transaction card of claim 8 manufactured by the process further comprising laser cutting the primary surface to form a chamfered edge between the primary surface and a side surface.

11. The transaction card of claim 8 manufactured by the process further comprising laser cutting the pocket into the primary surface.

12. The transaction card of claim 8 manufactured by the process further comprising
forming a green body from the fiber-reinforced ceramic material;
firing the green body at a firing temperature to create a fired green body;
grinding the fired green body into the card body; and
polishing the primary surface of the card body.

13. The transaction card of claim 8 manufactured by the process further comprising leveling a first side of the module to be flush with the primary surface.

14. The transaction card of claim 8 manufactured by the process further comprising extending the recess in a direction of the secondary surface.

15. The transaction card of claim 8, wherein the module is an integrated radio frequency (RF) module.

16. A method of manufacturing a transaction card, comprising:
creating a card body comprising a fiber-reinforced ceramic material, the card body including a primary surface and a secondary surface;
laminating a plastic or metal layer to the primary surface;
creating a pocket in the primary surface, the pocket extending through the plastic or metal layer;
creating a recess within the pocket; and
placing a module within the pocket, wherein:
a first surface of the module is flush with the primary surface;
an insulating material is disposed in the recess of the pocket, the insulating material acting as an adhesive and to electrically insulate the module;
the module has a non-uniform thickness; and
at least a portion of the second surface of the module is over the recess.

17. The method of claim 16, further comprising laser finishing the primary surface to add a laser matte feature disposed directly in the fiber-reinforced ceramic material, wherein the laser matte feature comprises at least a portion of the primary surface.

18. The method of claim 16, further comprising laser cutting the primary surface to form a chamfered edge between the primary surface and a side surface.

19. The method of claim 16, further comprising leveling a first side of the module to be flush with the primary surface.

20. The method of claim 16, further comprising extending the recess in a direction of the secondary surface.

* * * * *